United States Patent [19]
Reilly et al.

[11] Patent Number: 5,311,511
[45] Date of Patent: May 10, 1994

[54] SONET DS-N DESYNCHRONIZER

[75] Inventors: Brian F. Reilly, Cornelius; Robert S. Broughton, Portland; David Delgadillo, Aloha; Jeremy Smith, Beaverton, all of Oreg.

[73] Assignee: NEC America, Inc., Melville, N.Y.

[21] Appl. No.: 127,095

[22] Filed: Sep. 27, 1993

Related U.S. Application Data

[63] Continuation of Ser. No. 774,423, Oct. 10, 1991, abandoned.

[51] Int. Cl.$^5$ .............................................. H04J 14/08
[52] U.S. Cl. ................... 370/84; 370/105.3; 370/108; 375/118
[58] Field of Search ............. 370/84, 100.1, 102, 370/105.1, 105.3, 108; 375/118; 359/158

[56] References Cited

U.S. PATENT DOCUMENTS

| | | | |
|---|---|---|---|
| 4,191,976 | 3/1980 | Braun | 360/51 |
| 4,792,914 | 12/1988 | Dartois et al. | 364/607 |
| 4,811,340 | 3/1989 | McEachern et al. | 370/102 |
| 4,920,547 | 4/1990 | Murakami | 370/102 |
| 4,928,275 | 5/1990 | Moore et al. | 370/102 |
| 4,933,890 | 6/1990 | Nuytkens et al. | 364/721 |
| 4,941,156 | 7/1990 | Stern et al. | 375/118 |
| 4,975,699 | 12/1990 | Frey | 341/118 |
| 4,996,698 | 2/1991 | Nelson | 370/105.3 |
| 5,008,900 | 4/1991 | Critchlow et al. | 375/8 |
| 5,157,655 | 10/1992 | Hamlin, Jr. et al. | 370/84 |

Primary Examiner—Douglas W. Olms
Assistant Examiner—Melvin Marcelo
Attorney, Agent, or Firm—Sughrue, Mion, Zinn, Macpeak & Seas

[57] ABSTRACT

A SONET/DS-N desynchronizer and method for receiving an incoming stream of SONET (Synchronous Optical NETwork) data, having a controller for controlling either a direct digital synthesis circuit that provides a desynchronized clock for smoothly adapting the rate at which data is retrieved from a data buffer to the rate at which the incoming SONET data is stored in the data buffer. To minimize jitter and buffer spills (i.e., data overruns or underruns), the frequency and phase of the desynchronized clock is constantly varied to match the variations of the data rate of incoming SONET data. The DDS circuit generates the desynchronized clock, which has a center frequency equal to a predetermined frequency of a reference clock, whose phase is advanced or retarded in accordance with the magnitude of a tuning word supplied by a controller, which implements either a linear, non-linear, or fuzzy logic control algorithm. The controller periodically updates the tuning word in response to status variables to adjust the frequency of the clock output of the DDS circuit. In an alternative embodiment, a digital voltage controlled oscillator is used in place of the DDS circuit.

30 Claims, 10 Drawing Sheets

DAC OUTPUT

FIG. 6B

FILTER OUTPUT

SONET DS-N DESYNCHRONIZER

This is a Continuation of Application No. 07/774,423 filed Oct. 10, 1991, now abandoned.

BACKGROUND OF THE INVENTION

The present invention relates in general to an apparatus for receiving an incoming stream of a SONET (Synchronous Optical NETwork) payload envelope (SPE) and, more particularly, to a microcontroller for controlling a circuit that provides a desynchronized clock for smoothly adapting the rate at which DS-N data is retrieved from a data buffer to the rate at which the incoming SONET data is stored in the data buffer.

In telephone communications, in the past, data was carried exclusively over metallic media such as twisted pair and coaxial cable. Over metallic media, data is transferred at a speed or line rate of various levels. For example, the human voice can be carried as a digital signal at a line speed of 64 kilobits per second (kbps). For this line speed, the voice signal must be sampled 8,000 times each second, and using pulse code modulation, each voice value is carried as an eight-bit sample. This 64 kbps rate is called the Digital Signal level 0, or DS-0, rate. Higher rates, such as DS-1, DS-2, DS-3, . . . DS-N also exist, and are described in the International Telegraph and Telephone Consultative Committee (CCITT) Recommendations G.703. However, the speed at which data is transferred over metallic media is limited. To overcome this limitation, optical fiber media have been developed, which can accommodate much higher line speeds, and hence can transfer much more information in a given period of time.

For optical fiber transmission systems, the SONET standard defines a line rate hierarchy and frame format. SONET is an American National Standards Institute (ANSI) specification for a high-speed digital hierarchy for optical fiber communications, and is described in detail in ANSI T1.105 and T1.106.

The SONET TDM hierarchy is based upon transmission building blocks of 51.84 million bits per second (Mbps) each. The 51.84 Mbps rate is called the Synchronous Transport Signal level 1 (STS-1). Subsequent rates or levels STS-N are all multiples of the basic rate of 51.84 Mbps, for example, the STS-3 rate is 155.52 Mbps.

Figure 1:
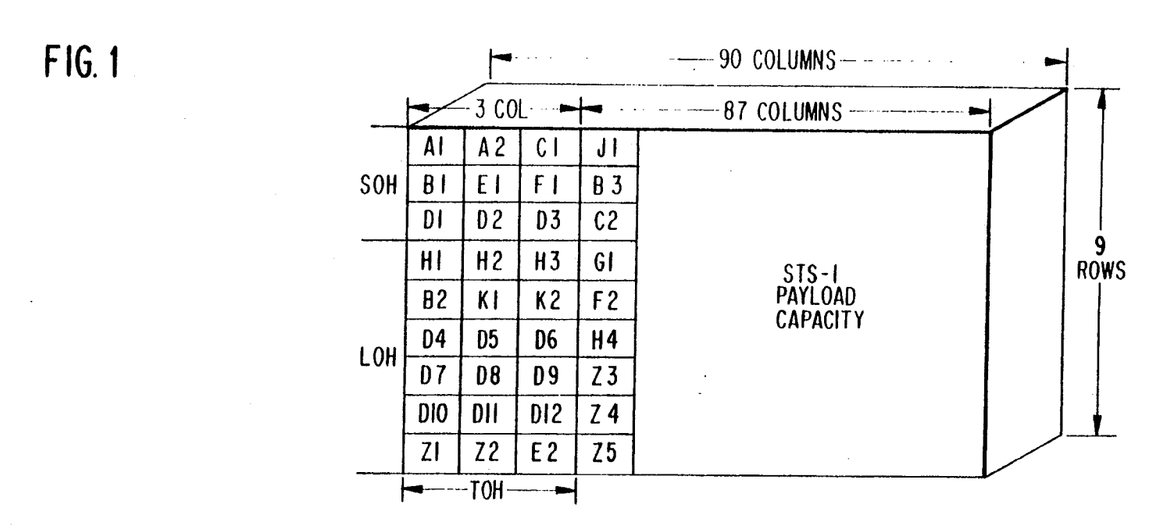
FIG. 1 shows an STS-1 frame in conformance With the SONET standard.

The basic unit of transport is the STS-1 frame, which as shown in FIG. 1, is organized into nine rows of 90 bytes or 810 bytes per frame. Each frame is generated 8,000 times per second (8 kHz), thus, yielding the 51.S4 Mbps STS-1 rate (i.e., 8000 frames/second * 810 bytes/frame * 8 bits/byte).

The first three columns of each frame provide Transport Overhead (TOH) information for providing operations, administration, maintenance, and provisioning control type functions. The remaining 87 columns (i.e., 873 bytes) include the STS-1 Envelope Capacity or Synchronous Payload Envelope (SPE).

Each row of the SPE begins with a Path Overhead (POH) byte which is also used for operations, administration, maintenance, and provisioning control type functions. The remaining 774 bytes are free for transporting voice/data signals. Although exactly one STS-1 SPE can fit into one STS-1 frame (including the TOH and POH data bytes), an SPE will usually begin in one STS-1 frame and end in the next. In other words, the SPE does not occupy a fixed position within the STS-1 frame, but rather "floats," and thus spans into two frames.

In theory, the frequency of an STS-1 frame should maintain a frequency of 8 KHz throughout the synchronous optical network, (i.e., from source to destination). However, for many reasons including the fact that different regions employ different timing references, SONET connections are not truly synchronous.

The SONET standard, however, provides a ten-bit pointer H1 and H2 as a rate adaption mechanism to compensate for different timing references. That is, the position of the first byte J1 of the SPE within an STS-1 frame is given by the ten-bit pointer H1 and H2, which is transferred in the TOH section. The pointer H1 and H2 provides the offset in number of bytes from their position in the TOH section to the first SPE byte J1.

Consider, for example, a SONET multiplexer where an incoming data tributary has a data rate (or frequency) that is higher than its nominal value, which is equivalent to the case where the multiplexer transmits with a frequency lower than the nominal. The tributary data will "pile up" at the multiplexer (i.e., data overrun) since the data from the SONET source is arriving faster than the multiplexer is transmitting it to the DS-N system. To prevent data overruns, the multiplexer will occasionally begin an SPE cycle one byte time earlier than usual. Such an action is referred to as a negative pointer adjustment, and results in the SPE being repositioned one byte earlier than its previous position relative to the STS-1 frame. On the other hand, when the data tributary has a lower than nominal frequency or the multiplexer transmits with a higher than nominal frequency, the multiplexer performs a positive pointer adjustment from time to time to avoid a data underrun.

Figure 2:
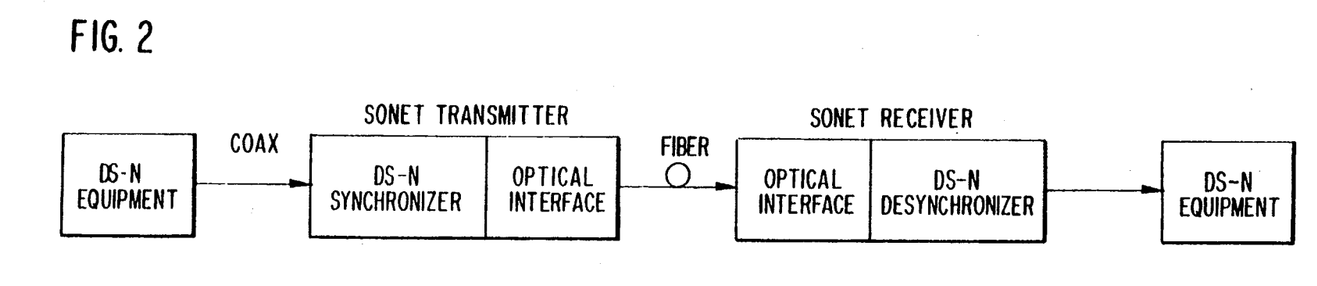
FIG. 2 shows an end-to-end connection of DS-N type equipment.

FIG. 2 shows a block diagram of an "end-to-end" connection of DS-N type equipment. There is shown a transmitter which includes DS-N type equipment coupled to a SONET transmitter which includes a DS-N synchronizer and an Optical Interface. The SONET transmitter is coupled by optical fiber to a SONET receiver, which is composed of an optical interface and DS-N desynchronizer, the desynchronizer being the focus of the invention described herein. Finally, the received and desychronized signal is received by the DS-N type receiving equipment.

In more specific terms, the transmitting equipment maps a DS-N signal to a SONET SPE portion of an STS-N frame, which is commonly referred to as "asynchronous DS-N mapping." The synchronizer synchronizes the operation of the connected DS-N equipment to the SONET equipment. On the other hand, the desynchronizer circuit on the receiving side recovers the DS-N signal from the SPE within the STS-N frame.

As an example, the asynchronous mapping standard for a DS-3 signal to a STS-1 signal provides a rate adaption mechanism for compensating for the different tolerances between the SPE at the STS-1 rate and the DS-3 rate. That is, a DS-3 signal has a nominal bit rate of 44.736000 Mbps, with a tolerance of ±20 ppm, whereas, the STS-1 signal has a nominal bit rate of 51.840000 Mbps, with a tolerance of ±4.7 ppm.

To adapt the DS-3 signal to the STS-1 signal, stuff bits (S-bits) are provided in each row of the SPE. Therefore, on average, the synchronizer will stuff two out of three bits, that is, one out of every three bits will contain DS-3 data that must be recovered to properly adapt the DS-3 signal to the STS-1 signal.

On the receiving end, the desynchronizer must recover or extract the DS-N data from the SPE of the STS-1 frame and provide the same to the DS-N equipment. In so doing, the desynchronizer must minimize jitter and avoid, if possible, buffer spills (i.e., data overrun and underruns) which occur when the receiving equipment is unable to match the frequency of its desynchronization clock to the rate of the incoming DS-N data. As stated above, buffer spills can occur due to SONET lines connected between different regions employing different timing references.

Jitter results because of at least two factors. First, the variation in the S-bit stuffing ratio and by pointer H1 and H2 adjustments. Both of these factors contribute to the variation in the rate at which the data buffer fills and empties, which in turn causes the desynchronizer to speed up or slow down.

It is, therefore, a function of the desynchronization circuit to smoothly adapt the rate of the outputted DS-N data sent to the DS-N type receiving equipment to the rate of the incoming SONET SPE data.

Desynchronizers which recover DS-N data from an SPE are known. For example, U.S. Pat. No. 4,996,698 to Nelson shows an apparatus for and method of integrating large phase hit error signals (which occur due to pointer adjustments) in a clock smoothing process to reduce jitter in the smoothed clock output. Nelson discloses a high pass filter and a summing circuit for filtering the large phase hit signal, and summing it with a periodically discontinuous clock. The summed result is then applied to a phase detector and second filter to produce a control signal which is applied to a voltage controlled oscillator. The output of the voltage controlled oscillator provides a continuous clock signal representing the smoothed clock.

The desynchronizer disclosed in Nelson, however, presents several disadvantages. First, because Nelson employs a voltage controlled oscillator for a frequency source, a low level of intrinsic phase noise (i.e., jitter) is hard to achieve. Second, the voltage controlled oscillator does not permit very fine resolution control of the frequency in comparison to a digital frequency control device, nor does it permit very precise frequency tuning. Finally, a voltage controlled oscillator requires "tweaking" at the time of manufacture, whereas a digital implementation does not.

U.S. Pat. No. 4,941,156 to Stern et al. relates to a jitter attenuation circuit. Specifically, Stern et al. discloses a FIFO which receives data that is synchronized with a write clock and puts out data in synchronism with a read clock. The read clock is synchronized with the write clock by a phase locked loop. The phase locked loop contains a digitally controlled linear oscillator, wherein the phase detector provides a quantized output to incrementally step the digitally controlled oscillator up or down in frequency to track the write clock while attenuating jitter.

The circuit disclosed in Stern et al. generally has similar disadvantages as the apparatus disclosed in Nelson. Furthermore, the digitally controlled oscillator is responsive to only the difference between the write address and read address, which does not provide an acceptable response to SONET data transmission circuits, particularly with large phase hit errors (i.e., pointer adjustments).

SUMMARY OF THE INVENTION

Accordingly, it is a general object of the present invention to provide a desynchronized clock for smoothly adapting the rate at which data is retrieved from a data buffer to the rate at which an incoming stream of SONET data is stored in the buffer and which is free of the above-mentioned problems and disadvantages.

It is also an object of the present invention to provide a desynchronizer including a direct digital synthesis circuit which provides low intrinsic phase noise (i.e., jitter), control of the frequency entirely in the digital domain with very fine resolution, very precise tuning control of the frequency, no "tweaking" at the time of manufacture, and the ability to be controlled with a microprocessor or microcontroller.

It is a further object of the present invention to provide a microcontroller and firmware to control the control loop using either a linear, non-linear, or fuzzy logic control implementation.

In accordance with the above and other objects, the present invention provides an apparatus for desynchronizing a SONET SPE payload to a DS-N type data, including first counting means for generating a first count in synchronism with a first clock having a first frequency, second counting means for generating a second count in synchronism with a desynchronized clock having a second frequency, buffer means for storing the SONET SPE payload at a location corresponding to the first count in synchronism with the first clock and for outputting DS-N type data from a location corresponding to the second count in synchronism with the desynchronized clock, offset means for determining a difference between the first count and the second count and for outputting an offset signal representative thereof, clock generating means, responsive to a control signal, for generating the desynchronized clock, and control means, responsive to the offset signal, for generating a control signal used to adjust the second frequency of the desynchronized clock such that the difference between the first and second counts is maintained at a minimum.

Further in accordance with the above objects, and according to a preferred embodiment of the present invention, the clock generating means includes a direct-digital synthesis circuit, responsive to the control signal ("tuning word"), for producing a signal having a variable frequency, an oscillator for generating a signal having a predetermined frequency, a mixer for producing the desynchronized clock having the second frequency which is equivalent to the summation of the variable frequency and the predetermined frequency, wherein the control signal is varied to adjust the variable frequency such that the second frequency of the desynchronized clock is adjusted to maintain the difference between the first count and the second count at a predetermined value.

Yet further, in accordance with another embodiment of the invention, the clock generating means includes a digitally controlled voltage controlled oscillator responsive to the control signal for producing the desynchronized clock.

Still further, the invention provides an apparatus for desynchronizing a SONET SPE payload to a DS-N type data, including buffer means for storing the SONET SPE payload at a location corresponding to a first count at a first rate and for outputting DS-N type data from a location corresponding to a second count at a second rate, clock means responsive to a control signal for generating a desynchronized clock having a frequency equivalent to the second rate, and a microcontroller responsive to a difference between the first and second counts for generating a control signal used to adjust the second rate such that the difference between the first and second counts is maintained at a predetermined value.

Still further, the invention provides a method of desynchronizing a SONET SPE payload to DS-N type data, including the steps of incrementing a first counter to produce write address data in synchronism with a SONET clock, writing the SONET SPE payload to a location in a buffer corresponding to the write address data in synchronism with the SONET clock, incrementing a second counter to produce read address data in synchronism with a desynchronized clock, reading the DS-N type data from a location in the buffer corresponding to the read address data in synchronism with the desynchronized clock, calculating an offset signal by subtracting the write address data from the read address data, calculating a frequency adjustment signal corresponding to the offset signal, and adjusting the frequency of the desynchronized clock to maintain the difference between the write address data and the read address data at a predetermined value.

The above and other objects, features, and advantages of the present invention will become more apparent from the following detailed description taken in conjunction with the accompanying drawings.

DESCRIPTION OF THE PREFERRED EMBODIMENTS

Figure 3:
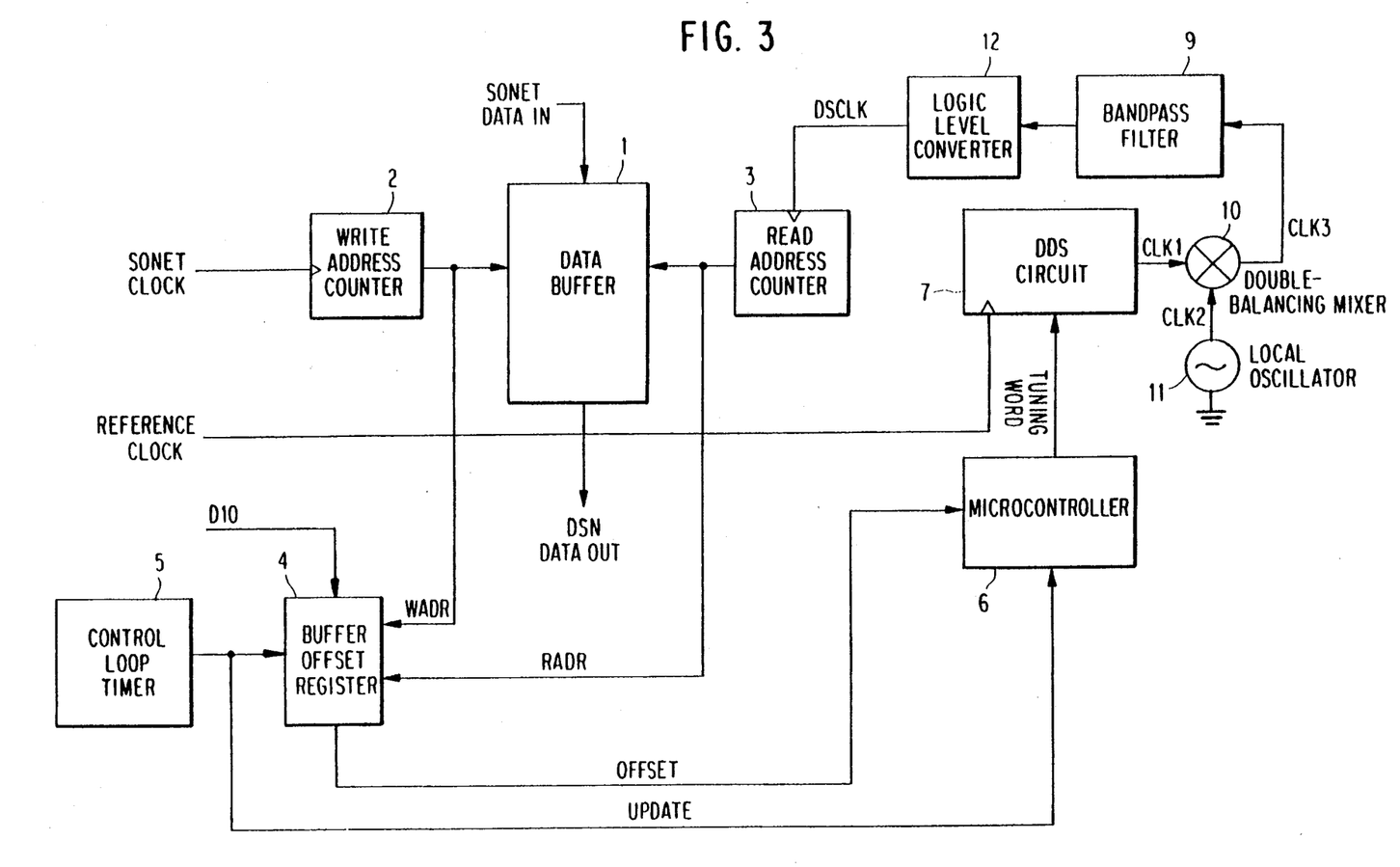
FIG. 3 shows a block diagram of a preferred embodiment of a SONET/DS-N desynchronizer circuit in accordance with the present invention.

With reference to FIG. 3, there is shown a block diagram of a SONET/DS-N desynchronizer circuit in accordance with the present invention. A burst of data applied to an input of a data buffer 1 includes the Synchronous Payload Envelope (SPE) within an STS-1 frame. The overhead information, namely, the section overhead, line overhead, and path overhead, transferred within an STS frame has previously been extracted by a SONET demultiplexer (not shown). In general, the SPE data is written to or read from the data buffer 1 at locations determined by a write address counter 2 and a read address counter 3. The write address counter 2 generates and outputs write address data WADR to the data buffer 1 in synchronism with a SONET clock which originates from a high accuracy distributed reference clock. Similarly, the read address counter 3 generates and outputs read address data RADR to the data buffer in synchronism with a desynchronized clock DSCLK.

Figure 4:
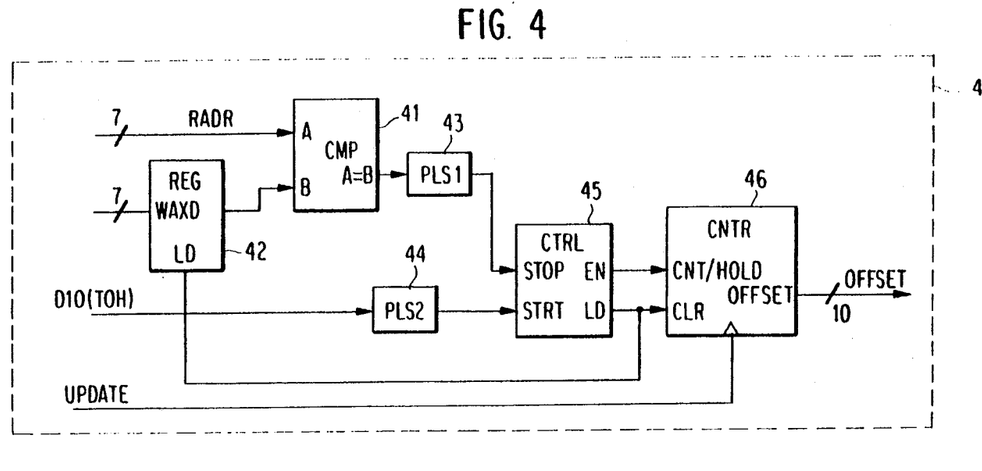
FIG. 4 shows a detailed block diagram of the buffer offset register of FIG. 3.

The respective outputs RADR and WADR of the read and write address counters 2 and 3 are also applied to and sampled by a buffer offset register 4, which is shown in more detail in FIG. 4. Upon each assertion of an update signal UPDATE, which is supplied by a control loop timer 5, the buffer offset register 4 provides an offset signal OFFSET indicative of the difference between the write address data WADR and read address data RADR.

The frequency adjustment algorithm is designed to maintain the signal OFFSET at a predetermined value, which is the "setpoint" of the control loop. Typically, this requires adjusting the frequency so that the read address lags one-half the buffer length behind the write address.

A microcontroller 6 receives as inputs the offset signal OFFSET from the buffer offset register 4 and the update signal UPDATE from the control loop timer 5 for providing a tuning word signal to a direct-digital synthesis (DDS) circuit 7. In response to the tuning word signal, which indicates whether the period of the DDS clock should increase, decrease or stay the same, and a DDS reference clock, the DDS circuit 7, which is shown in greater detail in FIG. 5, generates and outputs to a first input of a mixer 10 a clock signal CLK1 having a frequency $f_1$. A second input of the mixer 10 is coupled to an output of an oscillator 11 which provides another clock signal CLK2 having a frequency of $f_2$. While the frequency of the oscillator's out put remains steady, the frequency of the output from the DDS circuit is adjusted either up or down to compensate for variations in the incoming data rate.

The mixer 10 combines the two clock signals CLK1 and CLK2 to produce an output clock signal CLK3 having a frequency $f_3$ equal to the sum (i.e., upper sideband $f_1+f_2$) of the input frequencies $f_1$ and $f_2$ of the clock signals CLK1 and CLK2 and to the difference (i.e., lower sideband $f_2-f_1$) of the input frequencies $f_1$ and $f_2$. In this preferred embodiment, the upper sideband is selected because $f_1$ equals 1.736 MHz and $f_2$ equals 43 MHz. However, if $f_2$ is greater than 44.736 MHz, then the lower sideband would be selected. The clock signal CLK3 is then applied to a bandpass filter 9 and a logic level converter 12 which provides the desynchronizer clock signal DSCLK of frequency $f_3$ to the read address counter 3 clock input.

For the purposes of illustration, a SONET/DS-3 desynchronizer is considered, wherein the nominal rate of the DS-3 signal is 44.736 Mbps. That is, for a SONET/DS-3 desynchronizer, the frequency $f_3$ of the clock signal CLK3 ideally should equal 44.736 MHz. To minimize costs, a 44.736 MHz clock is not directly synthesized, as theoretically this would require a DDS reference clock of a frequency of at least two times 44.736 MHz, and in practice about 110 MHz. Instead, a low speed clock (approximately 2 MHz) is directly synthesized and then heterodyned up to 44.736 MHz. Specifically, for the SONET/DS-3 desynchronizer, the local oscillator clock signal CLK3 is selected to have a frequency $f_2$ of 43 MHz. The clock signal CLK1 is selected to have a frequency $f_1$ of 1.736 MHz. Therefore, the upper sideband (i.e., sum of frequencies $f_1$ and $f_2$) will be at a frequency of 44.736 MHz, which is the nominal rate of a DS-3 signal. The DDS circuit 7 can then be tuned to frequencies slightly above or below the 1.736 MHz frequency to adapt the desynchronizer to the incoming data rate.

As stated above, the tolerance of the desynchronized DS-3 clock DSCLK is specified by Bellcore standards to be 44.736 MHz±20 ppm, which is approximately ±895 Hz. This tuning range is easily achieved by the DDS circuit 7.

With reference now to FIG. 4, the buffer offset register 4 is shown in greater detail. The read address signals RADR from the read address counter 3 are applied to a first input A of a comparator 41. The write address signals WADR are applied to an input of a register 42 whose output is coupled to a second input B of the comparator 41. An output A=B of the comparator 41 is coupled to a pulse generator 43 whose output is coupled to a stop input STOP of a controller 45. A start input STRT of the controller 45 is coupled to a signal D10 via a second pulse generator 44. The signal D10 is also coupled to load inputs LD of the register 42 and controller 45 and to a clear input CLR of a counter 46. The signal D10 is used as a timing reference point and is based on the byte D10 from the TOH section of the STS-1 frame. An enable output EN of the controller 45 is coupled to a CNT/$\overline{\text{HLD}}$ input of the counter 46. An output of the counter 46 supplies the offset signal OFFSET, which is applied to an input of the microcontroller 6 each time the signal UPDATE, which is coupled to a clock input of the counter 46, is asserted.

The signal OFFSET indicates how far the read counter is behind the write counter. When the signal D10 is asserted, the counter 46 is cleared, the write address data WADR is registered by the register 42, and the counter 46 is enabled to begin counting. When the read address data RADR equals the write address data WADR, the output A=B of the comparator 41 is asserted, causing the counter 46 to stop counting, which now outputs the offset signal OFFSET until the next signal D10 is asserted.

Figure 5:
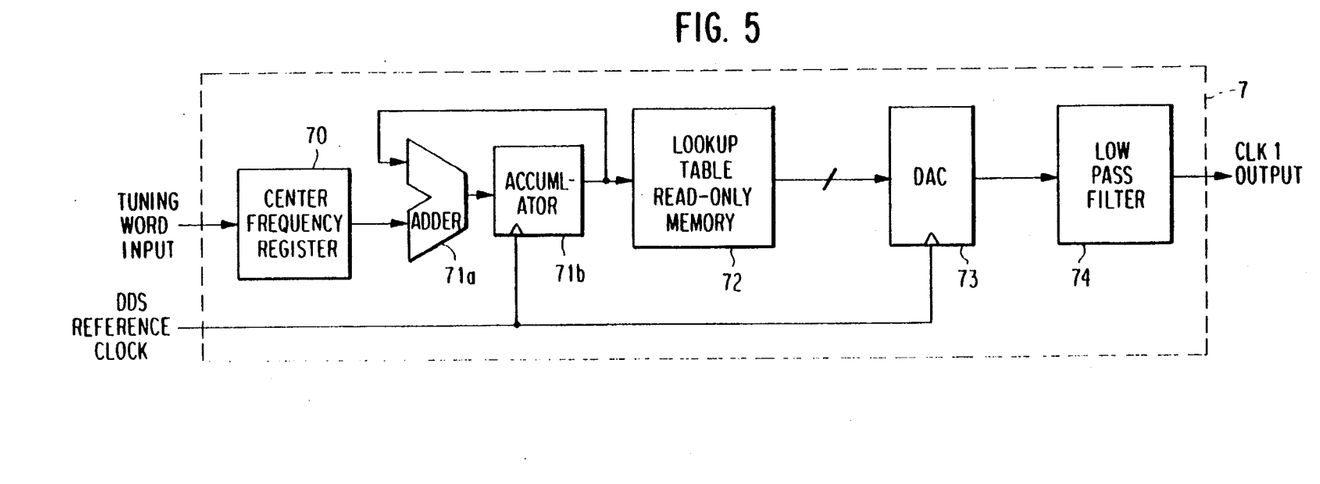
FIG. 5 shows a detailed block diagram of the direct-digital synthesizer circuit of FIG. 3.

Referring now to FIG. 5, there is shown a block diagram of the DDS circuit. The frequency adjustment output signal or tuning word signal of the microcontroller 6 is coupled to an input of a center frequency register 70. The register 70 holds and outputs the same value for the tuning word for a period of each reference clock cycle. The output of the register 70 is coupled to a first input of a binary adder 71a. A second input of the binary adder 71a is coupled to the output of an accumulator 71b, which output is also coupled to an input of a look-up table read only memory (LUT ROM) 72. The output of the binary adder 71a, which supplies the summation of the first and second inputs, is coupled to an input of an accumulator 71b, which retains the value for each reference clock period. The binary adder 71a and accumulator 71b are each located within a phase accumulator 71. During each reference clock cycle, the new phase value is calculated by adding the tuning word to the previous phase value. Hence, the value of the tuning word determines the rate at which the phase advances in each cycle. Moreover, as the tuning word is increased in magnitude, the phase advances a greater amount each cycle, so that the output waveform increases in frequency. The tuning resolution of the output frequency is $f_{ref}/2^N$, where N is the number of bits in the phase accumulator output.

Figure 6A:
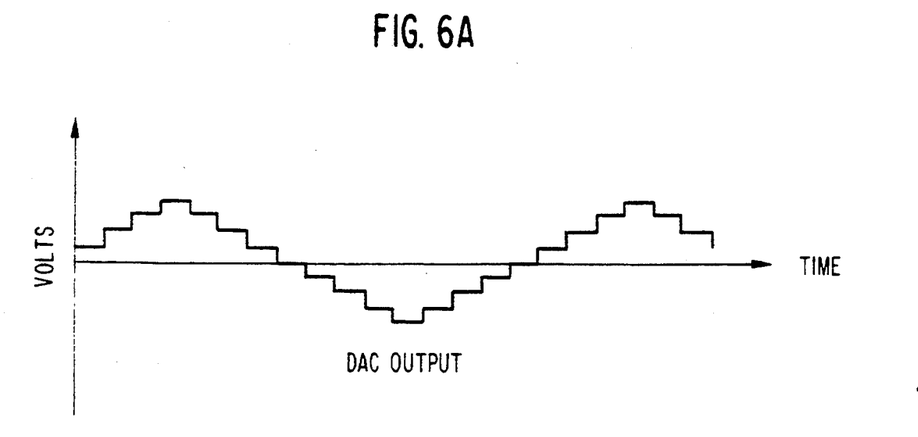
FIGS. 6A and 6B, respectively illustrate waveforms of the digital-analog converter and low pass filter of FIG. 5.
Figure 6B:
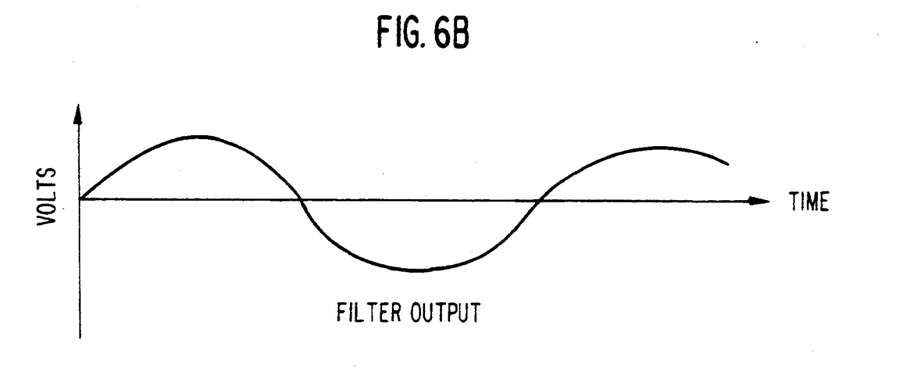

The LUT ROM 72 puts out a signal which corresponds in either voltage or current to the magnitude of the accumulator's output and which is applied to a digital-analog converter (DAC) 73. The output of the DAC 73, which is coupled to the input of a low pass filter 74, supplies for each period of the DDS reference clock a stair-stepped approximation to a desired waveform, as illustrated in FIG. 6A. The low pass filter 74 smoothes the input to that which is shown in FIG. 6B, thus providing the clock signal CLK1.

The microcontroller 6 implements in firmware the logic for generating the tuning word or frequency adjustment signal for controlling the DDS circuit. There are three implementations available, namely, a linear controller, a non-linear controller, and a fuzzy logic controller, which are discussed herein. First, however, a general overview of the steps performed by the microcontroller 6 will be described with reference to FIG. 7.

Figure 7:
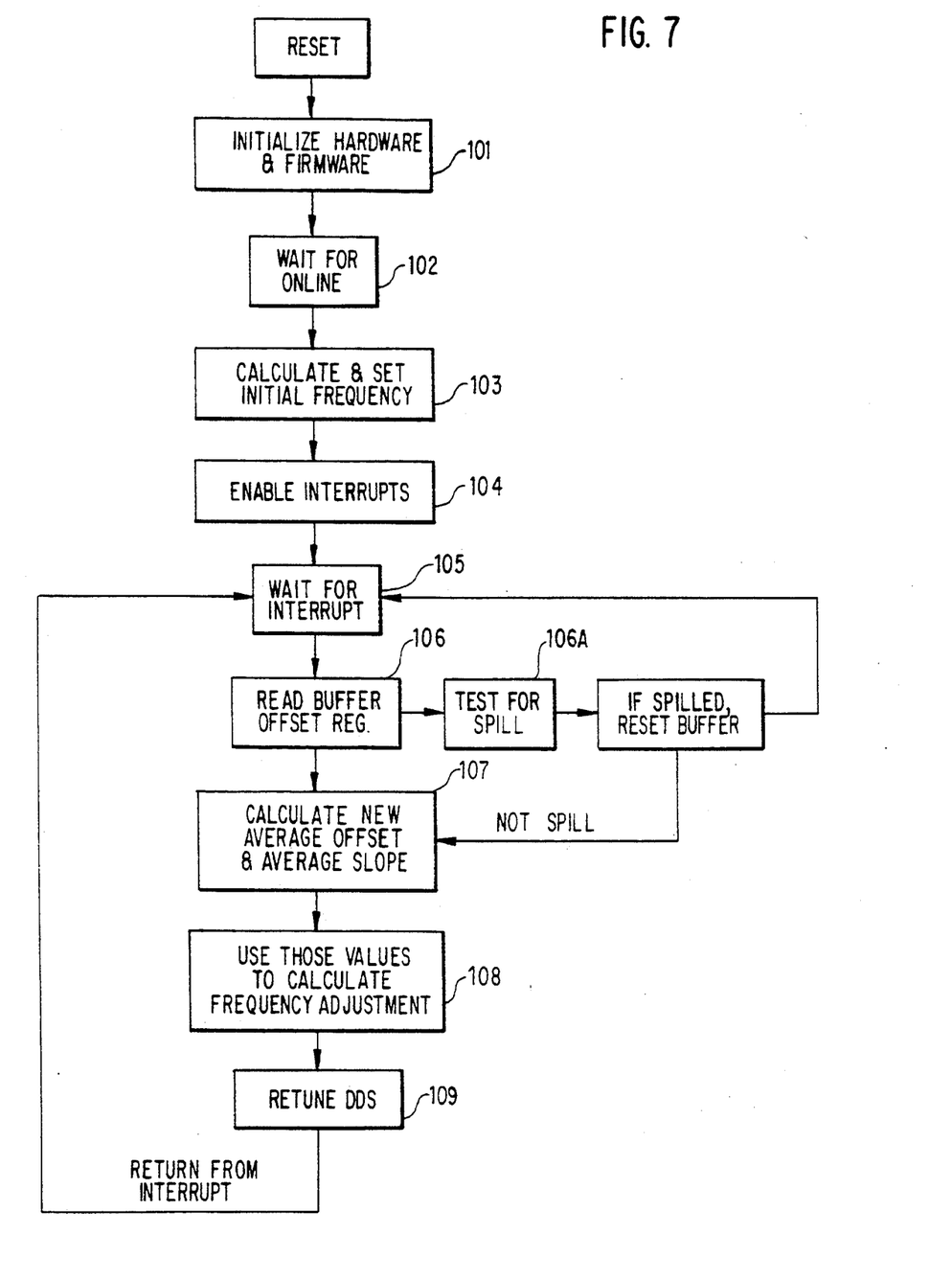
FIG. 7 illustrates a flow chart of the algorithm performed by the controller of FIG. 3.

In FIG. 7, a general flow chart illustrating the steps performed by the microcontroller 6 is shown. Upon a reset 100, the process flows to steps 101-104 which relate to initialization procedures. In step 101, the hardware and firmware (e.g., software parameters, pointers, etc.) are initialized. In addition, a diagnostic routine is performed to determine proper functioning of the equipment. In step 102, the firmware waits to be configured to an "on-line" mode. In step 103, an initial frequency, that is, the frequency at which the read address counter 3 generates an output, is calculated. Finally, interrupts are enabled and the process moves to the main body of the routine.

In step 105, the firmware waits for an interrupt which occurs periodically, for example, every 9 ms. On the occurrence of an interrupt, the process proceeds to step 106 where the buffer offset register 4 is read, retrieving the signal OFFSET which, again, represents the difference between the write address data WADR and the read address data RADR. Next, in step 106a, a determination is made whether the buffer has spilled, that is, whether the read address crossed over the write address (data underrun), or has the write address crossed over the read address (data overrun). If a spill has occurred, the buffer 1 is reset in step 106B and the process returns back to step 105 to wait for the next interrupt. On the other hand, if a spill has not occurred, the process moves on to steps 107-109.

In step 107, a new (or updated) average offset and average slope are calculated. The average offset is simply the average of a predetermined number (e.g., eight) of past offset values retrieved from the buffer offset register 4. The average slope, which provides the rate of change (i.e., first derivative) is the difference between the most recent offset value retrieved from the buffer offset register 4 and the least recent (i.e., the eighth oldest) offset value retrieved from the buffer offset register 4.

Step 108 is implemented in accordance with one of the three methods of implementations. In general, however, the frequency adjustment or tuning word is calculated, and applied to the DDS circuit in step 109. Finally, the process returns to step 105 to begin the above steps 106-109 again upon the next occurrence of the interrupt.

Figure 8:
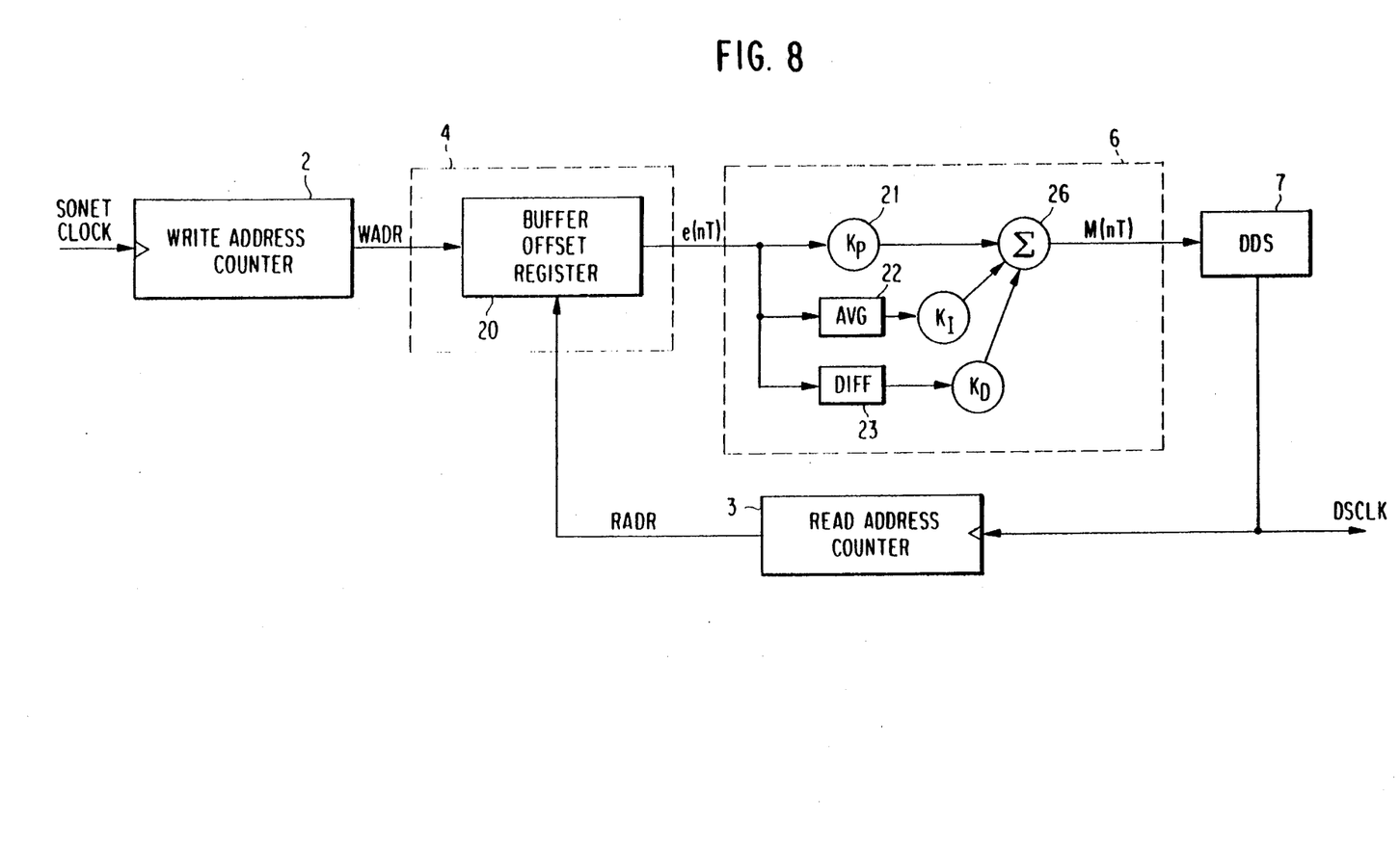
FIG. 8 illustrates a model of a linear controller.

Referring to FIG. 8, there is shown a "Proportional-Integral-Differential" (PID), which logically illustrates the algorithm for the linear controller. An error signal e(nT) is applied to an input of the microcontroller 6, and a frequency adjustment output signal m(nT) of the microcontroller is applied to the DDS circuit 7.

The error signal e(nT), which actually is the offset signal OFFSET, is generated by a subtractor 20, which is located within the buffer offset register 4, and equals the difference between the write address data WADR and the read address data RADR. The frequency adjustment signal m(nT) or tuning word is a function of the present value of the offset signal, average offset value over a predetermined number of previous samples (e.g., eight), and the rate-of-change of the offset value over the sample history that is used to compute the average offset (e.g., the last eight samples). The frequency adjustment signal m(nT) equals the sum 26 of the error signal e(nT) times a scaling factor $K_p$, the average value of the error signal e(nT) times a scaling factor $K_I$, and the rate-of-change of the error signal e(nT) times a scaling factor $K_D$. The scaling factors $K_p$, $K_I$, and $K_D$ are respectively indicated in FIG. 8 at reference numerals 21, 24, and 25. The average and rate-of-change are illustrated by blocks 22 and 23, respectively. The frequency adjustment signal m(nT) is best defined by the following equation:

$$m(t) = K_p e(t) + K_I \int_0^{T_i} e(t)dt + K_D \frac{de(t)}{dt}$$

wherein $T_i$ is the time interval over which the average and the slope are calculated.

Figure 9A:
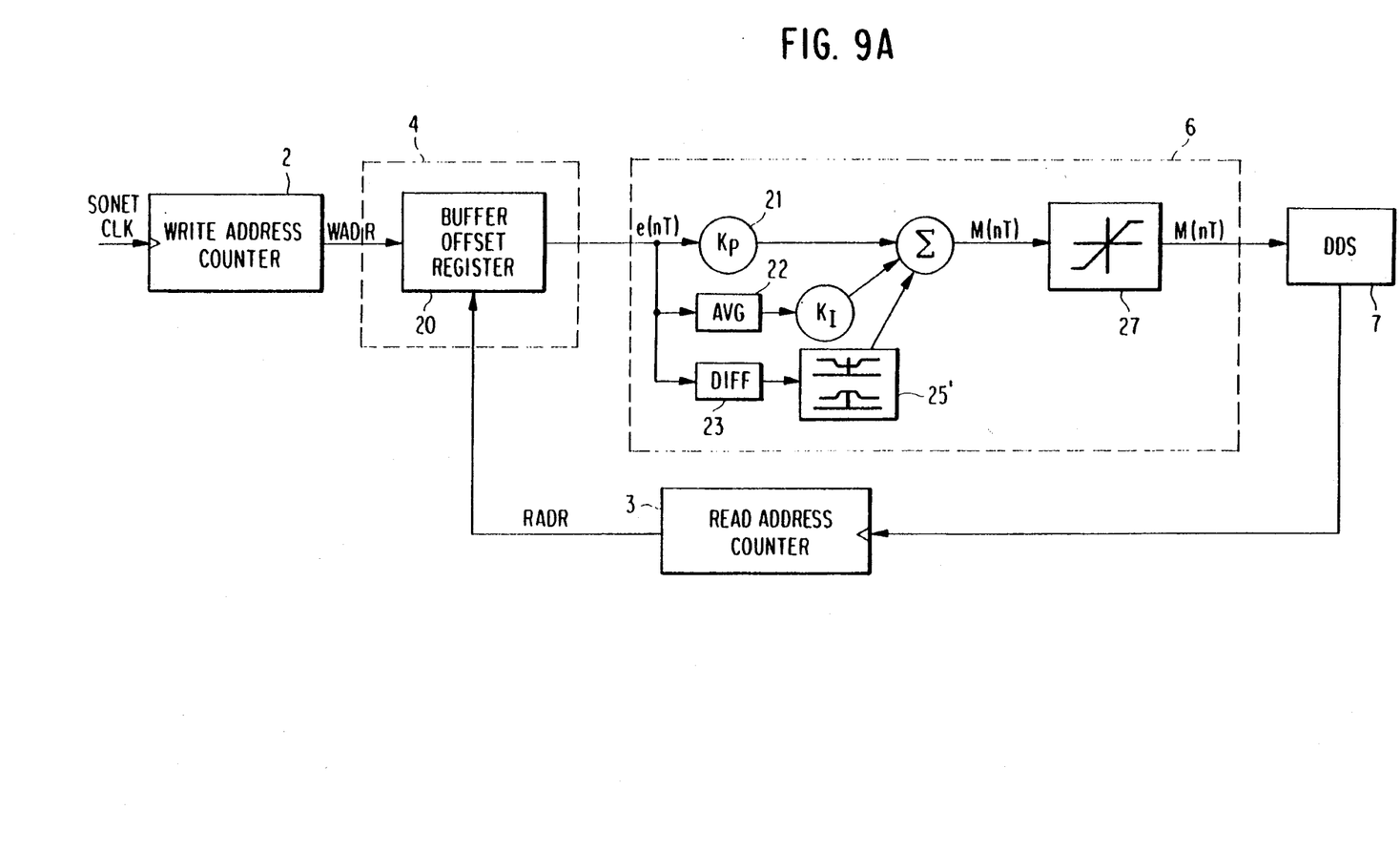
FIG. 9A illustrates a model of a non-linear controller.

The non-linear implementation is shown in FIG. 9A and is similar to the linear implementation except for the scaling constant $K_D$ 25' and the addition of an application curve 27. In the linear controller, the scaling factor $K_D$ 25 is simply a constant, whereas in the non-linear controller, the scaling factor $K_D$ 25' (also called a damping factor) depends on the average offset and the sign of the slope (first derivative). That is, the scaling factor varies as the average offset and slope change. In practical terms, the damping factor $K_D$ depends not only on whether the average offset is positive or negative, but also on whether the positive or negative average offset is becoming more positive or more negative.

Figure 9B:
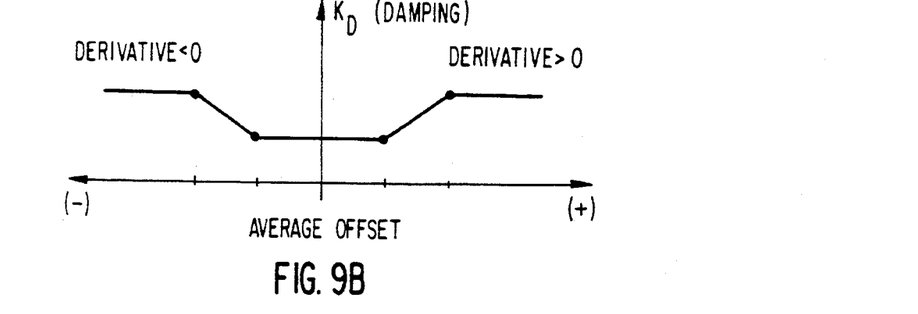
FIGS. 9B and 9C illustrate a graph of damping constants used in the non-linear controller of FIG. 9A.
Figure 9C:
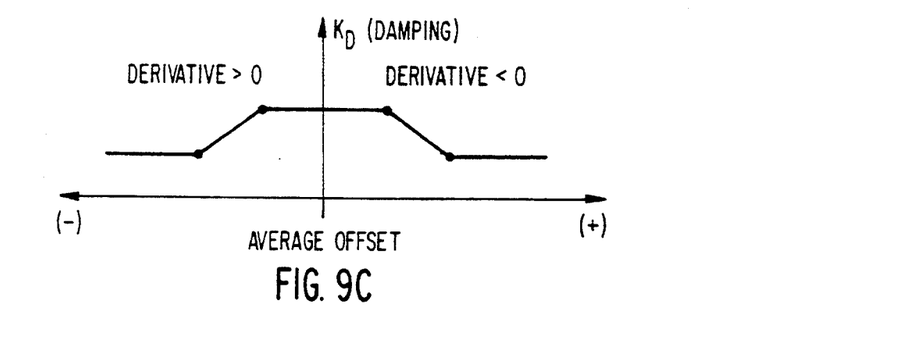

FIGS. 9B and 9C graphically illustrate the value for the damping scaling factor $K_D$ 25'. In FIG. 9B, the average offset and average slope have the same signs, which means that average offset is positive and becoming more positive with time, or that the average offset is negative and becoming more negative with time. On the other hand, in FIG. 9C, the average offset and average slope have the opposite signs. Therefore, FIG. 9C represents the situation where a positive average offset is becoming less positive with time, or a negative average offset is becoming less negative with time.

Figure 9D:
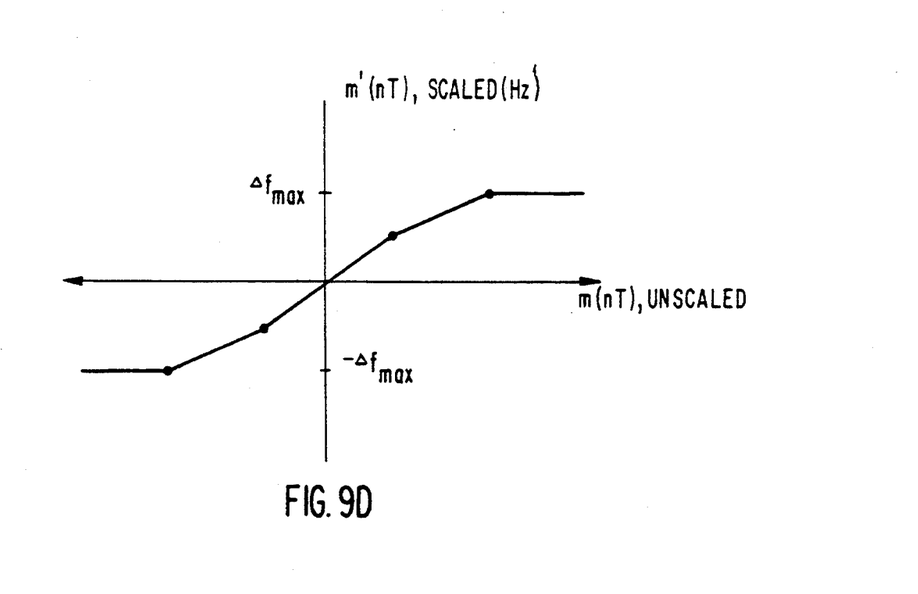
FIG. 9D illustrates a graph of an application curve used in the non-linear controller of FIG. 9A.

The application curve 27, an example of which is shown in FIG. 9D, converts and scales the frequency adjustment signal m(nT), which is the equivalent of Equation 1, to a change of frequency m'(nT) (Hz). Variations of the signal m(nT) around the origin demand a lesser frequency adjustment than variations farther away from the origin.

Figure 10:
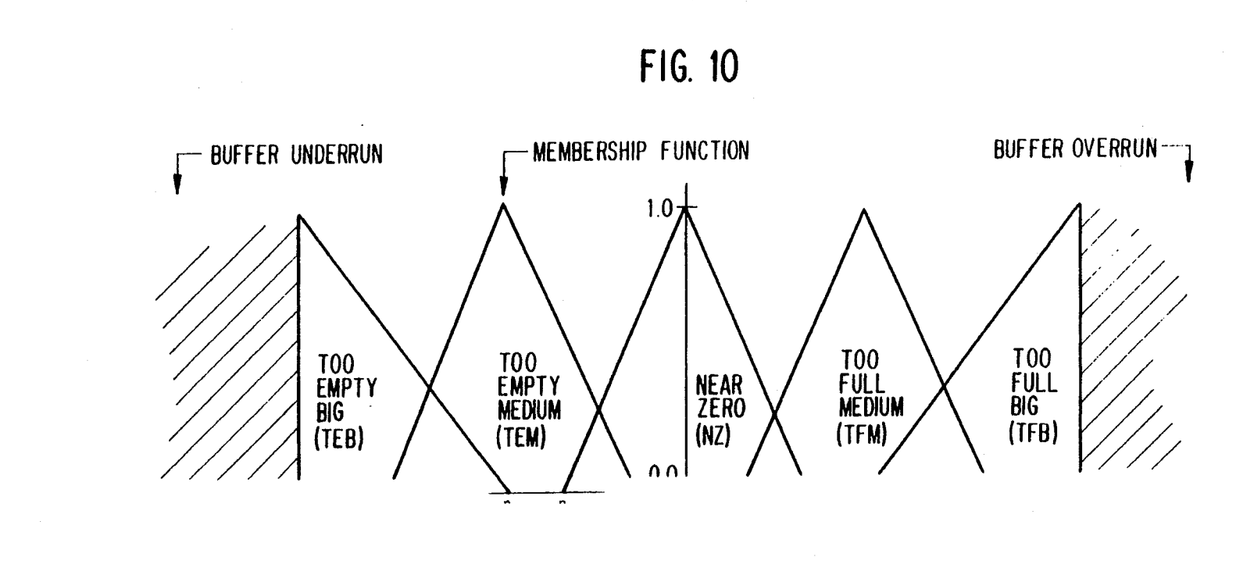
FIG. 10 shows graphically fuzzy sets for use in a fuzzy logic controller.

The third method of implementation relates to a fuzzy logic controller. As in the two previous implementations, in step 107, the average offset and average slope (i.e., the rate of change) are calculated. For the fuzzy logic implementation, these values are referred to as decision variables. Next, in step 108, the decision variables are classified into their respective fuzzy sets corresponding to the degree in which they differ from the target values. That is, the decision variables are classified into one of the fuzzy sets, examples of which are "TOO EMPTY BIG," "TOO EMPTY MEDIUM," "NEAR ZERO," "TOO FULL MEDIUM," and "TOO FULL BIG," as shown in FIG. 10. In practical terms, the fuzzy sets provide an easy way of expressing how much data is currently stored in the buffer 1.

The degree of membership in a fuzzy set lies in the range of zero to one, where zero represents the null membership and one represents full membership. It is quite common that any given status value does not have full membership in any one set but has partial membership in a number of fuzzy sets.

Next, the classified variables are evaluated according to a set of rules in the form of "IF (), THEN ()," to decide the action to take such as "SPEED UP A LOT" or "SLOWDOWN A LITTLE." For example, a rule may be of the specific form "IF ((average offset equals $A_1$) AND (average slope equals $A_2$)) THEN (frequency adjustment equals $A_3$)." Variables $A_1$, $A_2$, and $A_3$ are simply design parameters which will change according to the application. Accordingly, the DDS circuit 7 would be adjusted by an amount indicated by the frequency adjustment $A_3$.

The action rule may also be translated into a frequency adjustment or tuning word (in Hz) by using a degree of membership weighting of the decision variables. For example, if the degree of membership for "TOO EMPTY BIG" (TEB) is 0.5, and the degree of membership for "TOO EMPTY MEDIUM" (TEM) is 0.8, then the resulting change is determined by the following:

[ (0.5 * (A3 of TEB))+(0.8 * (A3 of TEM)) ] / 2

Finally, the process proceeds to step 109 where the newly calculated tuning word is applied to the DDS circuit 7.

Figure 11:
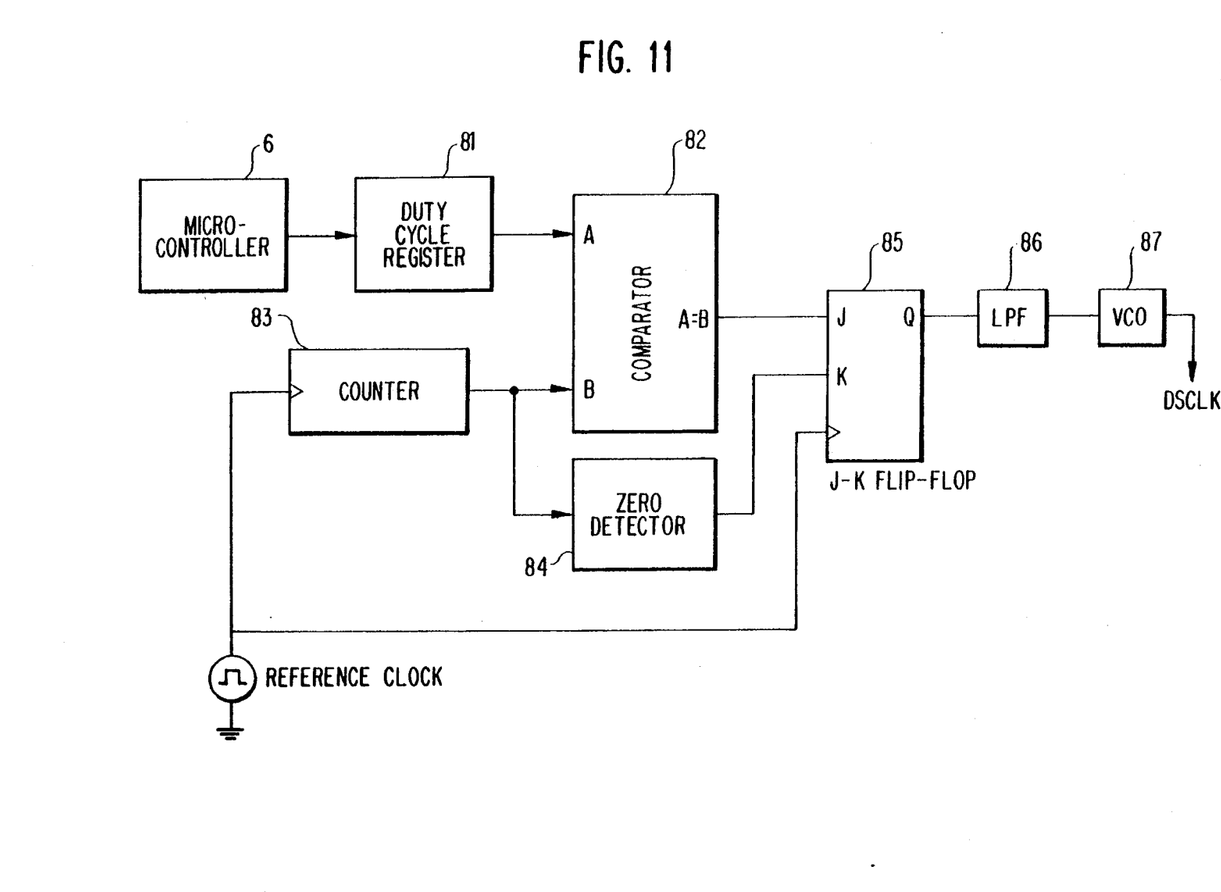
FIG. 11 shows an alternate arrangement of the direct-digital synthesizer of FIG. 5.

In an alternative embodiment, the DDS circuit 7 shown in FIG. 3 can be replaced by a digitally controlled voltage controlled oscillator (VCO), as shown in FIG. 11. The VCO, which is controlled by a signal PHASE CLOCK, puts out the desynchronized clock signal DSCLK. The frequency of the desynchronized clock DSCLK is adjusted according to the duty cycle of the signal PHASE CLOCK.

With specific reference to FIG. 11, the microcontroller 6 outputs the signal PHASE CLOCK with a calculated duty cycle to the duty cycle register 81. The output of the duty cycle register 81 is applied to a first input A of a comparator 82. A second input B of the comparator 82 is coupled to an output of a counter 83. The output of the counter 83 is also coupled to an input of a zero detector 84. An output A=B of the comparator 82 is applied to a first input J of a JK flip-flop 85, whose second input K is coupled to an output of the zero detector 84. Both the counter 83 and JK flip-flop have clock inputs which are coupled to the reference clock. An output Q of the JK flip-flop is coupled to a low-pass filter 86, whose output is applied to the VCO 87. Finally, the output of the VCO 87 supplies the desynchronized clock DSCLK.

In operation, the microcontroller 6 applies a signal to the duty cycle register 81 with a calculated duty cycle. When the input A equals the input B of the comparator 82, the output A=B is asserted, causing the output Q of the JK flip-flop 85 to be asserted high. When the counter 83 rolls over to zero, the zero detector 84 clears the JK flip-flop. The low-pass filter 86 smooths the output Q of the JK flip-flop to a DC level, which is then applied to the VCO.

For example, if the counter 83 counts a cycle of eight (zero to seven), and the microcontroller 6 signals to the duty cycle register 81 with a value of four, then the output Q of the JK flip-flop will be asserted high for the first half of the reference clock period and will be asserted low for the second half of the reference clock period, which corresponds to a 50% duty cycle.

If a larger value is written to the duty cycle register 81, then the counter must count higher before the output Q is asserted high, which narrows the duty cycle. As a result, the frequency of the VCO will decrease.

Although the above has many applications, the first embodiment employing the DDS circuit 7 is preferred because it can achieve a much higher tuning frequency resolution, and, as a result, less jitter during frequency adjustments in response to pointer hits, for example. Moreover, as stated above, a VCO implementation requires tuning of the nominal frequency at the time of manufacture, and for applications, for example, where a SONET SPE payload is converted to a DS-3 signal, the required VCO is relatively expensive.

There has thus been shown and described a novel SONET/DS-N desynchronizer which fulfills all the objects and advantages sought therefor. Many changes, modifications, variations, and other uses and applications of the subject invention will, however, become apparent to those skilled in the art after considering the specification and the accompanying drawings which disclose preferred embodiments thereof. All such changes, modifications, variations, and other uses and applications which do not depart from the spirit and scope of the invention are deemed to be covered by the invention, which is limited only by the claims which follow.

What is claimed is:

1. An apparatus for receiving a stream of SONET data including overhead information and a SONET SPE payload for desynchronizing the SONET SPE payload to a DS-N type data, comprising:
   first counting means for generating a first count in synchronism with a first clock having a first frequency;
   second counting means for generating a second count in synchronism with a desynchronized clock having a second frequency;
   buffer means, coupled to said first and second counting means, for storing said SONET SPE payload at a location corresponding to said first count in synchronism with said first clock, and for outputting DS-N type data from a location corresponding to said second count in synchronism with said desynchronized clock;
   offset means, coupled to said first and second counting means and responsive to at least a portion of said overhead information, for determining a difference between said first count and said second count in accordance with said portion of overhead information, and for outputting an offset signal representative thereof;
   clock generating means, responsive to a control signal, for generating said desynchronized clock; and
   control means, coupled to said offset means and responsive to said offset signal, for generating said control signal so as to adjust said second frequency of said desynchronized clock such that said difference between said first and second count is maintained at a predetermined value.

2. The apparatus as recited in claim 1, wherein said offset means comprises:
   counting means for counting at a predetermined rate when a first pulse is generated, wherein an output of said counting means constitutes said offset signal;
   register means for latching said first count when said first pulse is generated; and
   means for comparing said second count with said first count and outputting a signal when said second count equals said first count to stop said counting means from counting.

3. The apparatus as recited in claim 1, wherein said clock generating means comprises:
   a direct-digital synthesis circuit, responsive to said control signal for producing a signal having a variable frequency;
   an oscillator for generating a signal having a predetermined frequency;
   a mixer for producing said desynchronized clock having said second frequency which is equal to the sum of said variable frequency and said predetermined frequency, wherein said control signal is varied to adjust said variable frequency such that said second frequency of said desynchronized clock is adjusted to maintain the difference between said first count and said second count at a predetermined value.

4. The apparatus as recited in claim 3, wherein said direct-digital synthesis circuit comprises:
   a center frequency register responsive to said control signal for outputting for a complete period of a reference clock a registered control signal;
   phase accumulator means for calculating a phase control signal representative of the amount of increase or decrease of said variable frequency;
   a look-up table, responsive to said phase control signal, for generating a stair-stepped shaped signal corresponding in one of voltage or current to said phase control signal;
   a digital to analog circuit for converting to analog said stair-stepped shaped signal produced by said look-up table; and
   a low-pass filter means for smoothing said converted stair-stepped shaped signal to produce said signal having said variable frequency.

5. The apparatus as recited in claim 1, wherein said clock generating means comprises a digitally controlled voltage controlled oscillator, responsive to said control signal, for producing said desynchronized clock.

6. The apparatus as recited in claim 5, wherein said clock generating means further comprises:
   comparator having first and second inputs for outputting a signal when said first input equals said second input;
   a register for applying said control signal to said first input of said comparator;

a counter for counting a predetermined count signal in synchronism with a reference clock and outputting a signal to said second input of said comparator;

zero detector means for detecting when an output of said counter equals zero; and JK flip-flop means responsive to said comparator signal and an output of said zero detector means for producing a signal having a duty cycle corresponding to said control signal for controlling said digitally controlled voltage controlled oscillator.

7. The apparatus as recited in claim 1, wherein said control means comprises a linear controller.

8. The apparatus as recited in claim 1, wherein said control means comprises a non-linear controller.

9. The apparatus as recited in claim 1, wherein said control means comprises a fuzzy logic controller.

10. The apparatus as recited in claim 7, wherein said linear controller comprises:

means, responsive to said offset signal, for scaling said offset signal a first predetermined amount to produce a scaled signal;

means, responsive to said offset signal, for averaging said offset signal and scaling said averaged offset signal a second predetermined amount to produce a scaled averaged signal;

means, responsive to said offset signal, for differentiating said offset signal and scaling said differentiated offset signal a third predetermined amount to produce a scaled differentiated signal; and means for summing said scaled signal, said scaled averaged signal, and said scaled differentiated signal to produce said control signal.

11. The apparatus as recited in claim 8, wherein said non-linear controller comprises:

means, responsive to said offset signal, for scaling said offset signal a first predetermined amount to produce a scaled signal;

means, responsive to said offset signal, for averaging said offset signal and scaling said averaged offset signal a second predetermined amount to produce a scaled averaged signal;

means, responsive to said offset signal, for differentiating said offset signal and scaling said differentiated offset signal in an amount corresponding to a value of said offset signal, a sign of said offset signal, and a sign of said differentiated signal to produce a scaled differentiated signal;

means for summing said scaled signal, said scaled averaged signal, and said scaled differentiated signal to produce a frequency adjustment signal; and means, responsive to said frequency adjustment signal, for converting and scaling said frequency adjustment signal in an amount based upon a value of said frequency adjustment signal to produce said control signal.

12. The apparatus as recited in claim 9, wherein said fuzzy logic controller comprises:

means, responsive to said offset signal, for calculating decision variables, including at least an average offset signal and an average differentiated offset signal;

means for classifying said decision variables into predetermined fuzzy sets; and means for evaluating said classified variables according to a set of predetermined rules to produce said control signal.

13. The apparatus as recited in claim 12, wherein said fuzzy logic controller further comprises means for weighing the degree of membership of said decision variables to produce said control signal.

14. An apparatus for receiving a stream of SONET data including overhead information and a SONET SPE payload for desynchronizing the SONET SPE payload to a DS-N type data, comprising:

buffer means for storing said SONET SPE payload at a location corresponding to a first count at a first rate, and for outputting DS-N type data from a location corresponding to a second count at a second rate;

clock means, responsive to a control signal, for generating a desynchronized clock having a frequency equal to said second rate; and microcontroller, responsive to a difference between said first and second counts and to at least a portion of said overhead information, for generating said control signal so as to adjust said second rate such that said difference between said first and second count is maintained at a predetermined value.

15. The apparatus as recited in claim 14, wherein said microcontroller is a linear controller.

16. The apparatus as recited in claim 14, wherein said microcontroller is a non-linear controller.

17. The apparatus as recited in claim 14, wherein said microcontroller is a fuzzy logic controller.

18. The apparatus as recited in claim 14, wherein said clock means comprises a direct digital synthesizer circuit.

19. The apparatus as recited in claim 14, wherein said clock means comprises a voltage controlled oscillator.

20. The apparatus as recited in claim 19, wherein said voltage controlled oscillator is digitally controlled.

21. An apparatus for desynchronizing a SONET SPE payload to a DS-N type data, comprising:

a write counter generating a write count in synchronism with a first clock having a first frequency;

a read counter generating a read count in synchronism with a desychronized clock having a second frequency;

an elastic store coupled to said write counter and read counter for storing said SONET SPE payload at a location corresponding to said write count in synchronism with said first clock, and for outputting DS-N type data from a location corresponding to said read count in synchronism with said desynchronized clock;

buffer offset register coupled to said write counter and read counter for determining a difference between said write count and said read count, and for outputting an offset signal representative thereof;

a direct-digital synthesis circuit responsive to a control signal for producing a signal having a variable frequency;

an oscillator for generating a signal having a predetermined frequency;

a mixer for producing said desynchronized clock having said second frequency which is equal to the sum of said variable frequency and said predetermined frequency; and a controller coupled to said buffer offset register and responsive to said offset signal for generating said control signal so as to adjust said second frequency of said desynchronized clock such that said difference between said write count and said read count is maintained at a predetermined value.

22. The apparatus as recited in claim 21, wherein said buffer offset register comprises:
- a counter for counting upward from zero at a predetermined rate when a first pulse is generated, wherein an output of said counter constitutes said offset signal; and
- a comparator responsive to said write count and said read count for comparing said read count with said write count and outputting a signal when said read count equals said write count to stop said counter from counting.

23. An apparatus for receiving a stream of SONET data including overhead information and a SONET SPE payload for desynchronizing the SONET SPE payload to a DS-N type data, comprising:
- a write counter generating a write count in synchronism with a first clock having a first frequency;
- a read counter generating a read count in synchronism with a desynchronized clock having a second frequency;
- an elastic store coupled to said write counter and read counter for storing said SONET SPE payload at a location corresponding to said write count in synchronism with said first clock, and for outputting DS-N type data from a location corresponding to said read count in synchronism with said desynchronized clock;
- buffer offset register, coupled to said write counter and read counter and responsive to at least a portion of said overhead information, for determining a difference between said write count and said read count in response to said portion of overhead information, and for outputting an offset signal representative thereof;
- a digitally controlled voltage controlled oscillator, responsive to a control signal, for producing said desynchronized clock; and
- a controller coupled to said buffer offset register and responsive to said offset signal for generating said control signal so as to adjust said second frequency of said desynchronized clock such that said difference between said write count and said read count is maintained at a predetermined value.

24. The apparatus as recited in claim 23, wherein said buffer offset register comprises:
- a counter for counting at a predetermined rate when a first pulse is generated, wherein an output of said counter constitutes said offset signal; and
- a comparator responsive to said write count and said read count for comparing said read count with said write count and outputting a signal when said read count equals said write count to stop said counter from counting.

25. A method of desynchronizing a SONET SPE payload to DS-N type data, comprising the steps of:
- receiving a stream of SONET data including overhead information and the SONET SPE payload;
- incrementing a first counter to produce write address data in synchronism with a SONET clock;
- writing said SONET SPE payload to a location in a buffer corresponding to said write address data in synchronism with said
- incrementing a second counter to produce read address data in synchronism with a desynchronized clock;
- reading said DS-N type data from a location in said buffer corresponding to said read address data in synchronism with said desynchronized clock;
- determining a difference between said write address data and said read address data in accordance with at least a portion of the SONET overhead information.
- calculating an offset signal in accordance with said difference between said write address data and said read address data;
- calculating a frequency adjustment signal corresponding to said offset signal; and
- adjusting a frequency of said desynchronized clock to maintain the difference between said write address data and said read address data at a predetermined value.

26. The method as recited in claim 25, further comprising the steps of:
- clearing a third counter in response to a timing pulse;
- latching said write address data;
- enabling said counter to count;
- comparing said read address data with said write address data;
- stopping said counter from counting when said read address data equals said write address data; and
- outputting an output of said counter which constitutes said offset signal until a next occurrence of said timing pulse.

27. The method as recited in claim 25, further comprising the steps of:
- scaling said offset signal a first predetermined amount to produce a scaled offset signal;
- averaging said offset signal to produce an averaged offset signal;
- scaling said averaged offset signal a second predetermined amount to produce a scaled averaged signal;
- differentiating said offset signal to produce a differentiated offset signal;
- scaling said differentiated offset signal a third predetermined amount to produce a scaled differentiated signal; and
- summing said scaled offset signal, said scaled averaged signal, and said scaled differentiated signal to produce said frequency adjustment signal.

28. The method as recited in claim 25, further comprising the steps of:
- scaling said offset signal a first predetermined amount to produce a scaled offset signal;
- averaging said offset signal to produce an averaged offset signal;
- scaling said averaged offset signal a second predetermined amount to produce a scaled averaged signal;
- differentiating said offset signal to produce a differentiated offset signal;
- scaling said differentiated offset signal by an amount based upon the value of said offset signal, a sign of said offset signal, and a sign of said differentiated offset signal to produce a scaled differentiated signal; and
- summing said scaled offset signal, said scaled averaged signal, and said scaled differentiated signal to produce a control signal; and
- converting and scaling said control signal by an amount based upon a value of said control signal to produce said frequency adjustment signal.

29. The method as recited in claim 25, further comprising the steps of:
- calculating decision variables, including at least an average offset signal and an average differentiated offset signal;

classifying said decision variables into predetermined fuzzy sets; and evaluating said classified variables according to a set of predetermined rules to produce said frequency adjustment signal.

30. The method as recited in claim 29, further comprising the steps of weighing the degree of membership of said decision variables to produce said frequency adjustment signal.

* * * * *